United States Patent [19]

Turner, Jr.

[11] Patent Number: 5,367,214

[45] Date of Patent: Nov. 22, 1994

[54] SUBMERSIBLE MOTOR PROTECTION APPARATUS

[76] Inventor: John W. Turner, Jr., 2727 Kenross, Houston, Tex. 77043

[21] Appl. No.: 978,140

[22] Filed: Nov. 18, 1992

[51] Int. Cl.$^5$ .......................... H02K 5/10; H02K 5/12
[52] U.S. Cl. .................. 310/87; 417/423.3; 417/414
[58] Field of Search ............... 310/87, 89, 62, 63; 417/414, 423.14, 423.3; 166/68.5

[56] References Cited

U.S. PATENT DOCUMENTS

| 1,701,468 | 2/1929 | Arutunoff. | |
|---|---|---|---|
| 3,072,810 | 1/1963 | Luenberger | 310/87 |
| 3,153,160 | 10/1964 | Carle | 310/87 |
| 3,502,919 | 3/1970 | Boyd et al. | 310/87 |
| 3,571,636 | 3/1971 | Carle et al, | 310/87 |
| 3,671,786 | 6/1972 | Jones | 310/87 |
| 3,947,709 | 3/1976 | Waltman | 310/87 |
| 4,421,999 | 12/1983 | Beavers | 310/87 |
| 4,487,299 | 12/1984 | Bookout | 188/313 |
| 4,992,689 | 2/1991 | Bookout | 310/87 |

OTHER PUBLICATIONS

Centrilift brochure: "The system for higher-efficiency, higher profit pumping" (no date).

Trico Submersible System Composite Catalog (1991).
Centrilift Hughes: "The Latest Technology in Submersible Motor Protection" (1985).
Reda: Composite Products catalog (1989).
Reda: "System 90 Modular Protector for Submergible System" (1990).

*Primary Examiner*—Steven L. Stephan
*Assistant Examiner*—E. To
*Attorney, Agent, or Firm*—John R. Kirk, Jr.

[57] ABSTRACT

A protective device for a fluid-filled submersible electric motor powering a downhole pump in a well bore disposed between the motor and pump and forming a sealed assembly with the motor is described. The upper interior portion of the device is sealed to preclude the entry of well fluid and a vent near the lower end of its housing accommodates equalization of pressure between the interior of the device and the well bore with minimum contamination of the motor fluid. The protective device embodies a sealed chamber filled with motor fluid that communicates with the motor first by moving upward from a variable capacity chamber through an internal passageway and then downward through an annular passageway to the motor. An improved assembly for housing and orienting the operational parts of the device is also described.

15 Claims, 4 Drawing Sheets

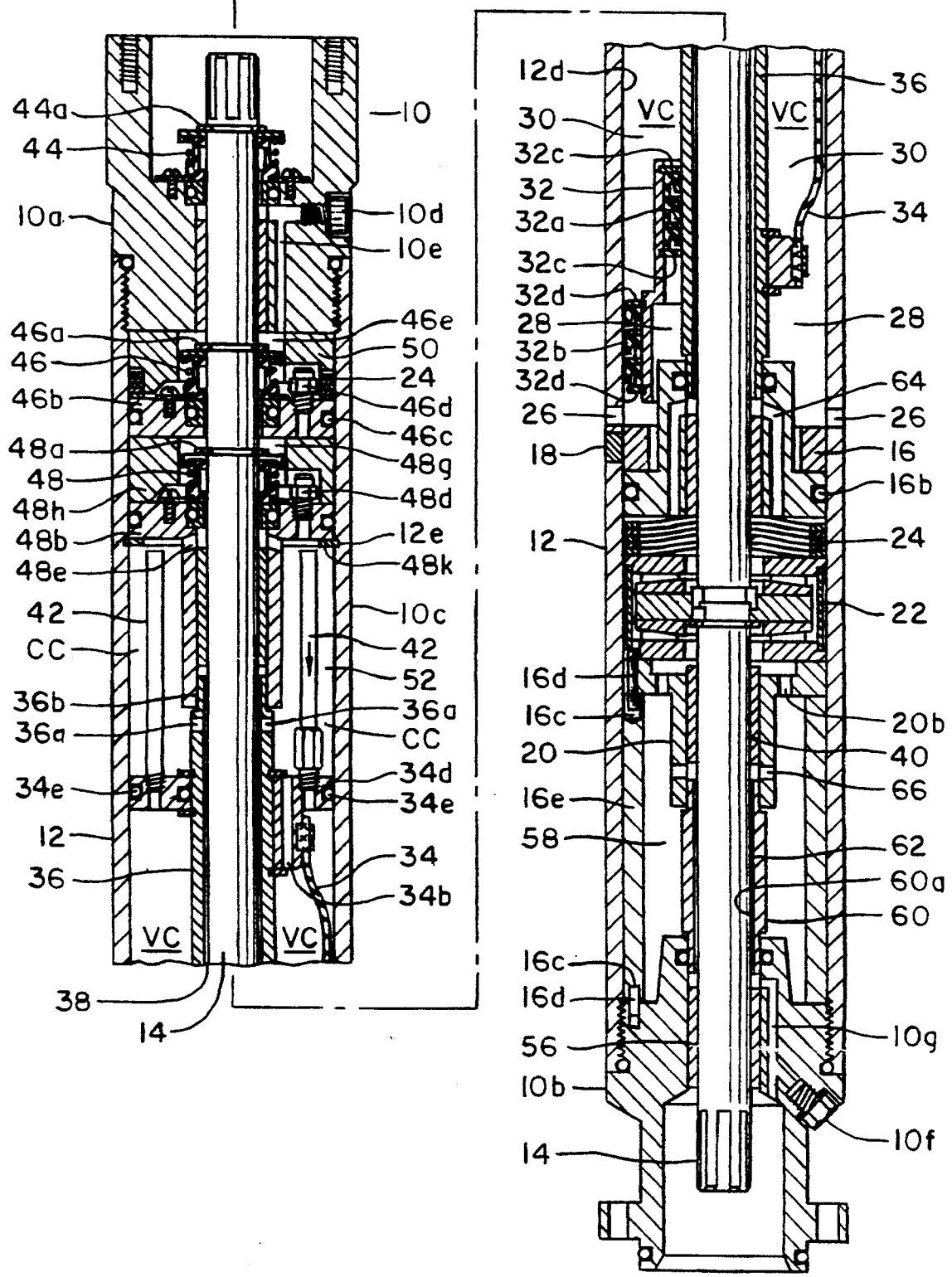

SUBMERSIBLE MOTOR PROTECTION APPARATUS

BACKGROUND OF THE INVENTION

This invention relates to a protective device for oil field type submersible electric motor and pump assemblies used for many years in the production of oil and water from reservoirs and well bores. Such a cylindrically-shaped downhole assembly normally includes a fluid-filled motor on the bottom, a pump disposed above the motor and a fluid-filled protective device for the motor in between which has internal fluid communication with the motor. The three components are usually assembled at the well site. The motor and its protective device are filled with a high dielectric strength fluid, usually a high-grade mineral oil. The assembly is positioned at the desired depth in the well bore and operated to produce well fluids from the well bore and reservoir.

Premature failures of submersible pump motors frequently occur due to the inability of the protective devices to perform the required functions for an extended period of time. Intrusive well fluids, often containing over 95 percent salt water, migrate downwardly through the protection devices and into the interior of motors to cause electric short circuits and burned windings. It is well recognized that protective devices for submersible motors are crucial to the efficient and economical operation of downhole electric pump assemblies.

Protective devices for fluid-filled submersible electric motors have been employed since the inception of submersible pump assemblies. Such protective devices are commonly referred to as "protectors", or "seal sections". The basic functions required of such a device include the means to (a) transmit torsional power between the motor and pump,
(b) restrict intrusive well fluid from the interior of the motor,
(c) provide a reservoir of high dielectric strength motor fluid that communicates with the motor to enhance electrical insulation, provide lubrication for bearings, and dissipate heat generated by the motor when running,
(d) provide for the expansion and contraction of the motor fluid due to changes in pressure and temperature and substantially equalize the internal pressure of the motor to that of the well bore, and
(e) isolate the motor from axial thrust that may be imposed by the pump.

The thermal expansion and contraction of fluid in the motor and protective device assembly, responding to ambient thermal conditions in the well bore and subsequent changes when the motor is run and stopped, is an important phenomenon that strongly influences the design of such devices.

After a motor and its protective device are assembled, their interconnected interior chambers are filled with motor fluid before being run into a well bore. As the pump assembly is lowered into the well bore, the motor fluid simultaneously experiences thermal expansion in response to temperature increases within the well bore.

The fluid expands with some being expelled from the device into the well bore through a vent near its upper end. Internal heat is generated when the motor is running and the fluid in the motor and protective device expands again with the expanded volume expelled into the well bore. When the motor is stopped, the temperature of the assembly diminishes and the motor fluid contracts with a volume of well fluid being drawn into the upper portion of the protective device. A proportional volume of motor fluid is drawn from the protective device back into the motor. The cycle of thermal expansion and contraction of the motor fluid is repeated each time the motor is run and stopped. Motor fluid in the upper chamber of the protective devices now in use can become progressively more contaminated after each cycle and its dielectric strength significantly reduced. Well fluids having a higher specific gravity than the motor fluid mitigate downwardly through the motor fluid causing contamination. Eventually, the contaminated motor fluid can migrate downwardly through the device and into the motor to cause the ultimate electrical failure.

There are two types of protective device designs that have been employed in field service for a many years. Each type satisfies the basic requirements briefly described above but differ in the method of creating the motor fluid chamber and effectiveness to maintain the motor fluid free from contamination by well bore fluid for an extended period of time.

One type of protective device is normally referred to as a "labyrinth-type" as described in U.S. Pat. Nos. 1,701,468, 3,153,160, 3,502,919, 3,671,786, for example. It employs one or more vertical labyrinth paths disposed in a plurality of serially connected cavities having fixed volumes initially filled with motor fluid. The function of the labyrinth is to retard the detrimental downward migration of intrusive well fluid through the device and into the motor. The cavities are not sealed from the well fluid and a vent near the upper end of the device provides direct communication between the well bore and the upper cavity. The well fluid and motor fluid interface with each other in that cavity and the effectiveness of the device is strongly dependent upon the immiscibility of the two fluids and their difference in specific gravity. Fluid is expelled from that cavity through the vent, and well fluid is drawn into the cavity in like manner, in response to the expansion and contraction in the volume of motor fluid in the device and motor due to changes in temperature. Since the vent is in the upper reaches of the protective device, labyrinth means in the cavity cause well fluids having higher and lower specific gravities than the motor fluid to be trapped within the very device designed to exclude them. Subsequently, retained well fluid can migrate downwardly traversing the labyrinth path entering the motor to cause a failure.

The second type of protective device is referred to as a "bladder-type", or "bag type" as described in U.S. Pat. Nos. 3,947,709, 3,571,636, 4,992,689, 3,072,810, for example. It has a sealed chamber for the motor fluid and generally comprises a plurality of serially connected cavities wherein at least one rubber-like tubular bladder is radially disposed around the axis and provides a variable capacity chamber to accommodate the expansion and contraction of motor fluid inside the device. The bladder provides a positive barrier between the well fluid and motor fluid. These devices describe a vent through the housing near the upper end of the device above the bladder which communicates with the well bore to facilitate the entry of well fluid into, and expulsion of fluid from, the cavity surrounding the exterior of the bladder in response to expansion and contraction. The bladder breathes out and in as the volume of motor fluid changes responsive to changes in temperature. Motor fluid, in excess of the capacity of the expanded bladder, is expelled into the well bore to maintain substantial equalization of pressure between the interior of the motor and the well bore. One or more labyrinth path means are generally disposed in the cavities to retard the detrimental downward migration of intrusive well fluids through the chamber and entry into the motor. The labyrinths may be disposed above and/or below the bladder. In most prior art devices the motor fluid in the bladder directly communicates with a passageway toward the motor. Thus, bladder failure creates a short path for contaminated fluid to access the motor. The "bladder-type" design configuration is technically superior to the "labyrinth-type" because well fluid is not in direct communication with the motor fluid when the bladder is in good condition. However, as commonly experienced, bladders develop structural failures and well fluid migrates through the failure point and enters the sealed chamber. Subsequently, the device then performs like the "labyrinth-type" and contaminated motor fluid can migrate downwardly traversing the labyrinth path to enter the motor and cause a failure.

U.S. Pat. No. 4,421,999 is an example of prior art which includes both labyrinth protection and bladder protection, even though the variable capacity bladder is located below the motor.

A third type of protection device is described in U.S. Pat. No. 4,487,299, which has mechanical internal parts biased to urge the motor fluid toward the motor.

Protective devices normally employ a rotatable seal about the shaft to preclude the migration of well fluid along the shaft and prevent entry into an upper cavity filled with motor fluid at the joint between the protector and the pump. Such seals also perform like a check valve to restrict fluid flow from one side, normally above, and bypass fluid within a selected pressure range, say 10-15 psi, from the other side, normally below. The physical failure of these seals provide another means by which intrusive well fluid may circumvent a labyrinth and be introduced directly into a lower chamber that communicates with the motor. Present protective devices are vented near their upper end and have serially connected cavities that are filled with motor fluid. Intrusive well fluid flows downwardly from the vent toward the motor. All of the cavities have communication with the motor connected below the device. Further, as can be seen from the patents mentioned above, the housing of these protective devices or seal sections are highly segmented involving complicated construction and assembly requirements. Many devices have been developed in the attempt to improve performance and ease construction, but much is lacking with respect to longevity of operation and simplicity of construction.

SUMMARY OF THE INVENTION

The present invention is directed to an improved fluid-filled motor protective device used with cylindrically-shaped submersible electric motor and pump assemblies of the type frequently employed in well bores to produce water and oil. The device is disposed between, and coupled in series with, a pump and companion electric motor to form a rigid and coaxially aligned assembly. The device and motor form a sealed assembly in fluid communication with each other internally in order to share the same motor fluid.

The device of the present invention provides a unique configuration among protective devices with a preferred single tube body for the housing and a prepositioned internal mounting ring which facilitates assembly while it accomplishes all requirements of a protective device. The upper interior portion is sealed against the intrusion by well fluid by axially spaced shaft seals that create a plurality of sealed and fixed-volume cavities filled with motor fluid. Each of the cavities can receive fluid from the cavity or chamber below it, but is prevented from discharging fluid back into the respective cavity or chamber. A variable capacity chamber is disposed in the lower portion of the device and a vent, through the housing near the lower end of the device, provides fluid communication between the exterior of the variable capacity chamber and the well bore or reservoir for pressure equalization with the interior of the device and motor. Any well fluid drawn upwardly through the vent, due to contraction of motor fluid volume in the device and motor, will remain until the flow ceases. Subsequently, when there is no ingress of well fluid through the vent, any water separates from the well fluid and, being heavier, will gravitate out of the vent and back into the well bore while being displaced by a well fluid having a lower specific gravity, thus effectively minimizing aqueous fluid intrusion. Heavier components of the well fluid, such as water or brine, must work their way upwardly to first circumvent the sealed variable capacity chamber and continues to travel upwardly, against gravity, through a labyrinth path before it can invade a passageway that allows downward migration toward the motor mounted below the device.

The device of this invention may employ a single housing tube to interconnect the head and base and form the cylindrical periphery of the housing means. This tube will have a plurality of circumferentially spaced holes. A support plate having a coaxial bore is placed inside the tube, transverse the longitudinal axis of the tube and is welded in place at the circumferential holes to provide a static base against which the components of the protective device are positioned. The support plate includes means for securing the stator of the thrust bearing from moving and yet provide passageways through which motor fluid can pass. This allows significant pre-assembly of the device on the shaft as well as other assembly conveniences.

Accordingly, an object of the present invention is to provide an improved fluid-filled protective device that forms a sealed assembly with a fluid-filled submersible electric motor for well pumps enhancing the longevity of the assembly operating in a well bore.

Another object of the invention is to provide an improved protective device that has a sealed and fluid-filled chamber which communicates with the motor and effectively precludes the intrusion of well fluids into the chamber and motor.

Another object of the invention is to provide an improved protective device that has a sealed and fluid-filled chamber that communicates with the motor and includes a plurality of shaft seals forming one or more sealed and fixed-volume cavities that are serially disposed in its upper portion to create barriers against the encroachment of well fluid from the upper end of the device; while taking advantage, through lower venting, of the higher specific gravity of the predominant contaminating well bore fluid, water or brine.

Still another object of the invention is to provide an improved variable capacity protective device with a fluid-filled chamber that has its upper interior portion sealed against the entry of well fluid and is vented through the housing near the lower end of the device to minimize mixing of well bore fluid with motor fluid and take advantage of differing specific gravities of such fluids.

Yet another object of the invention is to provide an improved protective device that is more effective, shorter in length, simpler in structure and less expensive to manufacture than existing equipment currently available.

The foregoing and other objects, features and advantages of the invention are shown in the illustrative figures and will be hereinafter described in detail, or will become apparent to those skilled in the art, without departing from features of this invention as defined in the appended claims.

BRIEF DESCRIPTION OF THE DRAWINGS

FIG. 4 shows the left hand vertical section of the piston embodiment with an additional fixed capacity chamber at the bottom of the protective device and the support ring welded into place above the thrust bearing FIG. 5 shows the right hand vertical section of the bladder embodiment with an additional fixed capacity chamber at the bottom of the protective device and the support ring welded into place above the thrust bearing.

DESCRIPTION OF THE PREFERRED EMBODIMENTS, INCLUDING THE BEST MODE

Figure 1:
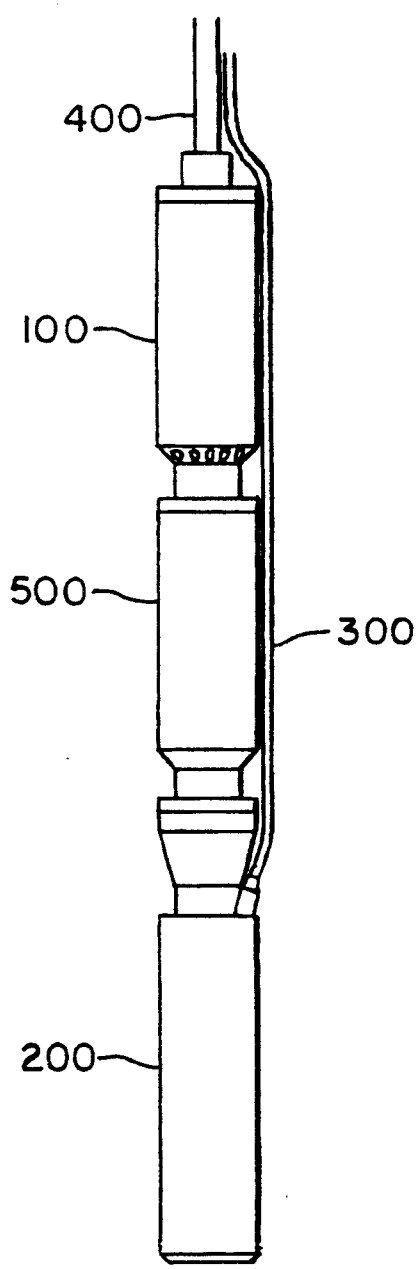
FIG. 1 is a side elevation view of a typical submersible electric motor, motor protective device, and pump assembly of this invention.

The sub-surface assembly for a submersible electric pump is relatively standard. It involves a pump 100 driven by an electric motor 200, powered by electrical connections 300, mounted on the end of tubing string 400. It is normal that the motor 200 is protected by a protective device or sealed chamber 500 which is mounted between the motor 200 and the pump 100 and carries a shaft operatively joining the motor 200 and the pump 100. In this context, many protective devices are available. Turning to the embodiment shown in FIG. 2, the protective device of this invention involves a housing generally indicated by 10 having a closed head 10a and base 10b which are threadably attached to a body 10c, which in the preferred embodiment of this invention, is a single tube 12. In the embodiment shown in FIG. 6, the body 10c is a two pieced tube 12a and 12b interspersed by a modular functional ring 12c. A shaft 14 extends axially upward through the axis of the body 12 of the housing 10 to operatively connect respectively with the motor 200 at the bottom and the pump 100 at the top. The configuration of the body 12 cooperates with a horizontal mounting support ring 16 to result in a steady, durable, compact protection device for the submersible motor assembly. The single tube concept with circumferential perforations 18 located a predetermined distance from each end of housing 10 allows the support ring 16 to be placed in the predetermined location and welded in place through the circumferential perforations 18. The support ring 16 provides surfaces 16a and 16b against which other parts of the protection device of this invention are oriented. The support ring 16 also provides a space 16c to receive a dowel 16d which serves as a means for orienting bearing sleeve 20 and the thrust bearing stator 22d. In the alternative embodiment, when the support ring 16 is above the thrust bearing 22, as shown in FIGS. 4 and 5, a cylindrical sleeve 16e supports the bearing sleeve 20 above the base 10b and also provide spaces 16c in its upper and lower end to receive dowels 16d which orient the thrust bearing stator 22d, the static component of thrust bearing 22, and bearing sleeve 20 with the base 10b. The bearing sleeve 20 carries a bushing 40 and provides for coaxial alignment of shaft 14 in housing 10.

The protective device of this invention can be assembled precisely on both sides of this support ring without the need of expensive threaded joints and the unneeded extra length added to the device by virtue of such cumbersome modular construction. The discussion which follows describes how such a precision device can be produced without the necessity of extremely close linear tolerances of the components. However, when the head 10a and base 10b are threaded into the body 10c, the parts are compressed into position by a series of circular wave springs 24 which take up the slack in the protective device 500. Those skilled in the art of designing such equipment will understand the number of leaves of the circular wave spring 24 may be varied dependent upon the amount of space which must be occupied and the amount of pressure to be brought to bear on adjacent elements. The ring 16 provides an assembly means which, when positioned at a specific point in the body 12, provides bearing surfaces 16a or 16b which may be used to juxtapose elements for position. The inner diameter of the support ring 16 is sufficiently large to allow the passage of not only components of the seal device, but, when assembled, allows free passage of motor fluid in the accomplishment of the function of protecting the motor 200. Additionally, the support ring 16 includes providing for a space 16c to receive a means, shown as a dowel 16d, for positioning the thrust bearing assembly 22 and bearing sleeve 20, or other elements of the protective device 500.

Figure 6:
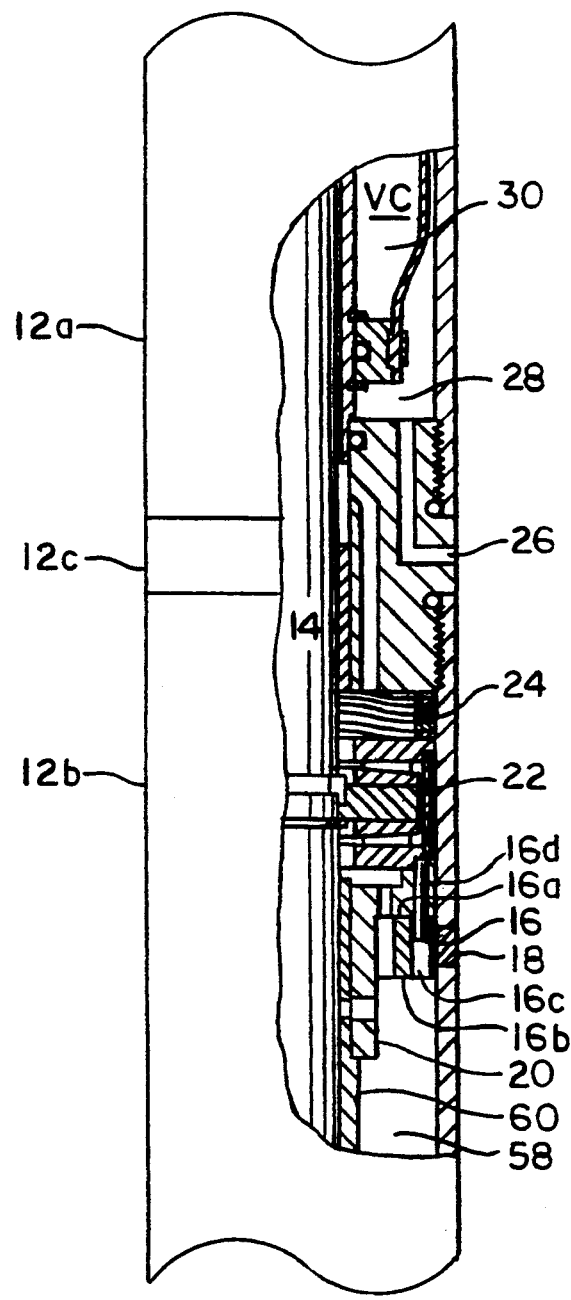
FIG. 6 is a partial section drawing showing an embodiment of this invention wherein the variable capacity chamber containing the bladder and an additional fixed capacity chamber at the bottom is accomplished by inserting a threaded ring section between two tubes used for the housing of the protective device.
Figure 2:
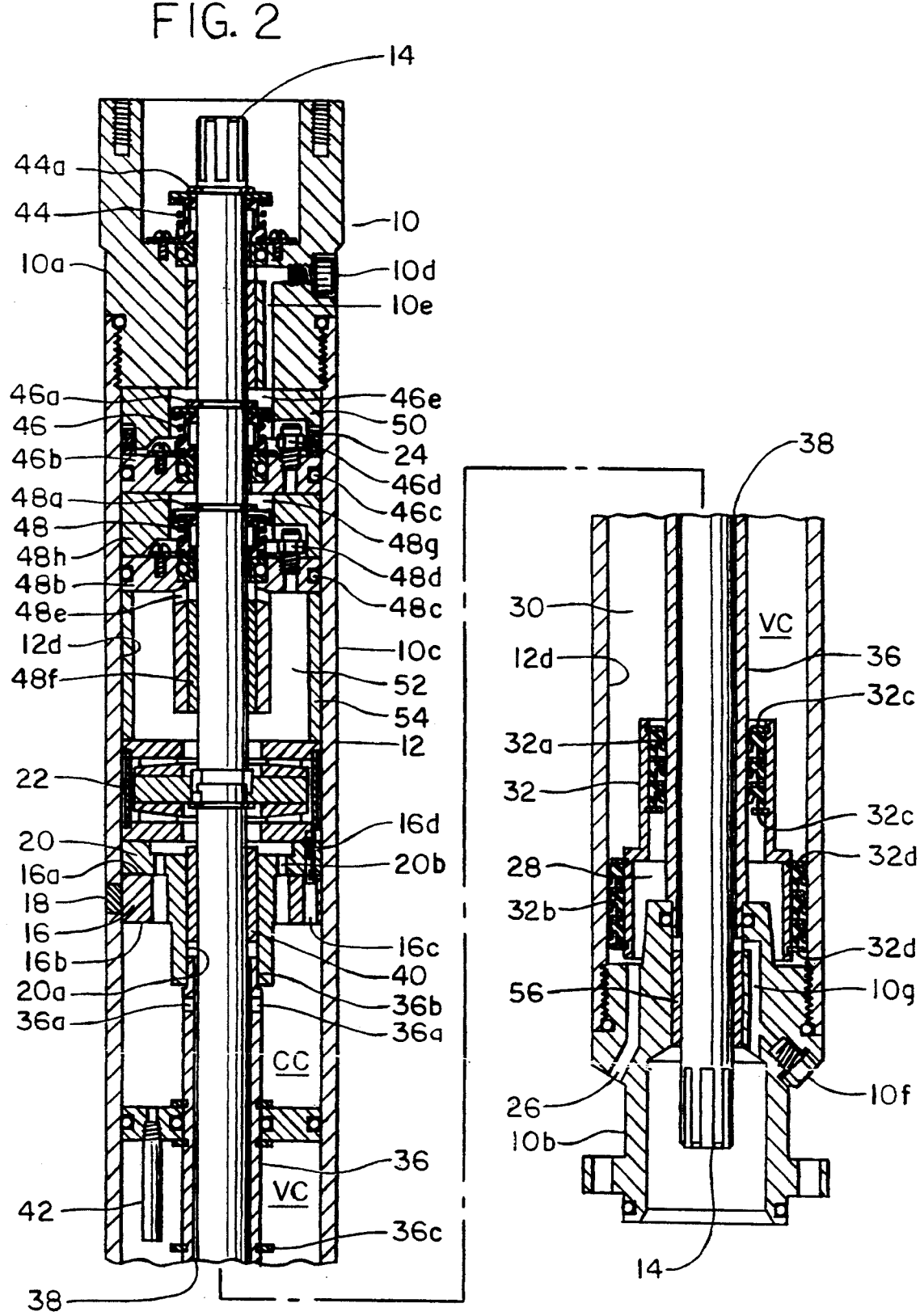
FIG. 2 is a vertical section view of the protective device of this invention showing the free-floating piston as the means for responding to pressure differentials in the variable capacity chamber.
Figure 3:
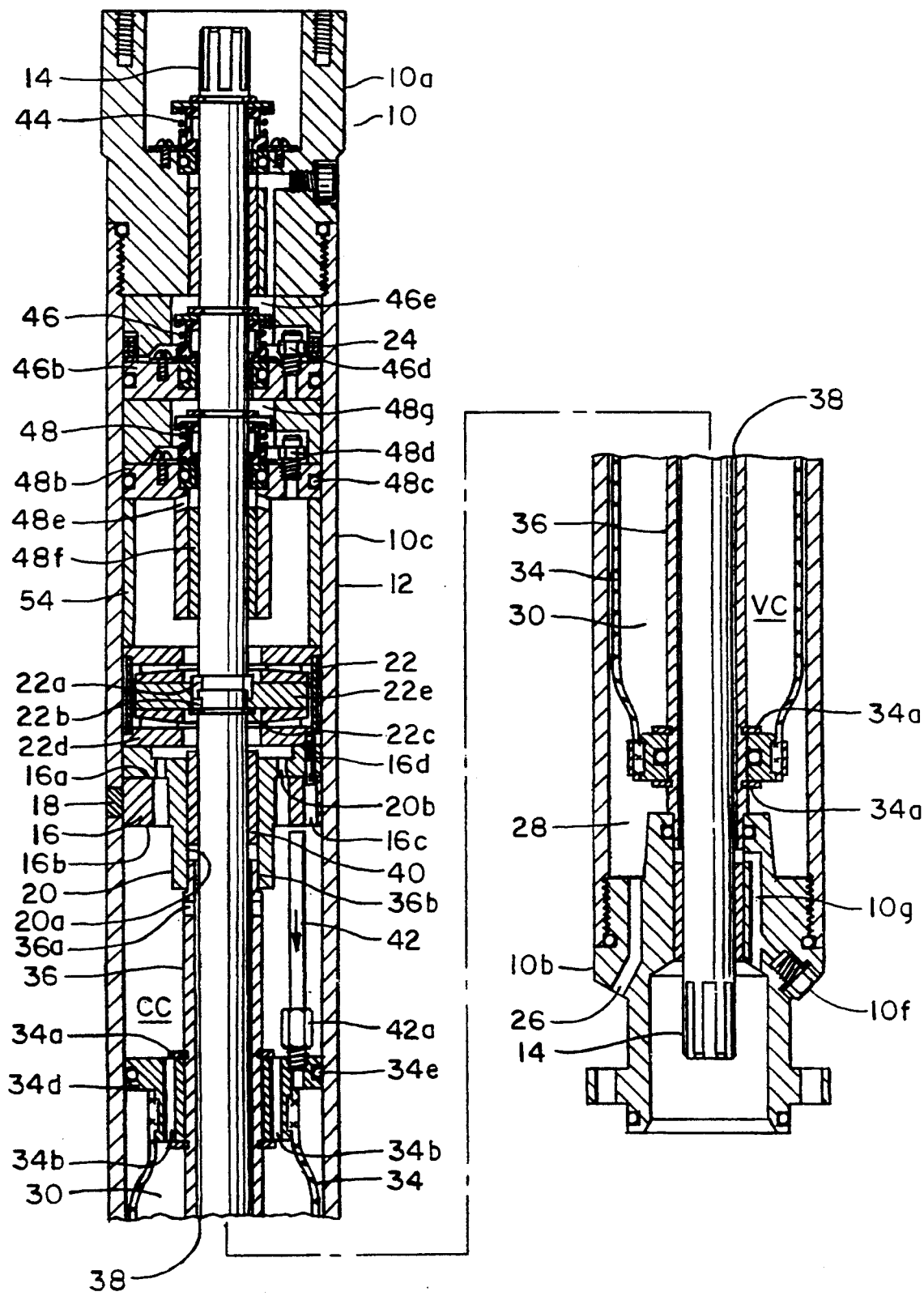
FIG. 3 is a vertical section view of the protective device of this invention showing a sealed bladder as the means for responding to pressure differentials in the variable capacity chamber.

In assembling the protective device 500, as shown in FIGS. 2, 3 and 6, the support ring 16 is positioned and welded into place through circumferentially located ports 18 disposed below the thrust bearing assembly 22 and bearing sleeve 20. It is noted in FIGS. 4 and 5 that the support ring 16 is welded in place through circumferential perforations 18 disposed above the thrust bearing assembly 22 and bearing sleeve 20. Thus it can be seen that parts can be positioned on the shaft 14 and slid into place without the necessity of precise positioning which will be described later. The ease of connection of the parts described hereafter are firmly positioned when the head 10a and base 10b are threaded onto the body 10c of the housing 10. The protective device 500 of this invention has the particular advantage in its preferred embodiments of communicating with the well bore or reservoir, as the case may be, allowing entrance of well bore fluid through a vent 26 proximate the bottom of the variable capacity chambers VC, communicating with the reservoir (or well) fluid pressure zone 28. This configuration provides for gravity separation of well fluid after it enters the reservoir fluid pressure zone 28. Heavy well fluid, such as water, can migrate back into the well bore, being displaced by a lighter fluid such as oil through vent 26, whether located in base 10b (FIGS. 2 and 3) or proximate the piston assembly 32 or bladder assembly (FIGS. 4, 5 or 6). Therefore, the probability of water being retained in pressure zone 28 and transgressing the piston assembly 32 barrier, or bladder assembly 34 barrier, to contaminate motor fluid in the variable capacity chamber VC is avoided when the protective device 500 is used in oil wells. Whereas the length of the reservoir fluid pressure zone 28 is shown to be relatively short, those skilled in the art of such equipment will recognize that it can be lengthened to increase its volume as need may require by merely lengthening the tubing 12 and shaft 14. In the apparatus of this invention, the variable capacity chamber VC is activated by differential pressure between pressure zone 28 and the motor fluid pressure zone 30. Accordingly, motor fluid flows upwardly from variable capacity chamber VC when pressure in pressure zone 28 exceeds the pressure in motor fluid pressure zone 30.

In FIG. 2 the variable capacity chamber VC is created by a free-sliding piston 32, also shown in FIG. 4. The piston assembly 32 includes inwardly facing seals 32a bearing on the surface of tube 36 and outwardly facing seals 32b which bear upon the inward surface 12d of the body 12. The seals 32a and 32b are readily available Clipper Oil Seals (J. M. Clipper Co., Nachogdoches, Tex.) which come in many sizes and characteristics which are well known. The seals 32a and 32b are shown as having three circular seals, it being understood that one skilled in the art may have more or less depending upon the needs involved. The piston seals 32a and 32b are low-friction type such that a differential pressure of about 0.3 psi will move the piston 32 when mounted within a protective device 500. Both the internal seals 32a and external seals 32b are shown in FIGS. 2 and 4, being unidirectional type pointed upwardly, will provide positive opposition to pressure from below. However, the piston assembly 32 will bypass motor fluid from the variable capacity chamber VC, the motor fluid pressure zone 30, upon the initial warming and expansion of that fluid in the protective device 500 and motor 200 when the pump assembly is lowered in the well bore. At such time, the piston assembly 32 rests at the bottom of the reservoir fluid pressure zone 28 and the motor fluid bypassing the seals 32a and 32b flows into the well fluid pressure zone 28. Motor fluid will cease to bypass seals 32a and 32b when pressure in pressure zone 30 and pressure zone 28 become substantially equal. It is well known that the pressure at which such seals may be bypassed are built into the seals by the manufacturer and it becomes only necessary to specify the bypass pressure range desired in order to obtain satisfactory seals. A pressure in range of about 6 to about 8 psi would be desired. This pressure is selected to be higher than the pressure required to open small check valves in upper constant capacity chambers described later and is lower than the 10 to about 15 psi pressure normally required to bypass motor fluid upwardly through the rotatable seals to be described in hereinafter. During operations in the well, when the pressure in the motor fluid pressure zone 30 exceeds the pressure in the well fluid pressure zone 28 by the preselected bypass pressure built into seals 32a and 32b, motor fluid will be allowed to pass into well fluid pressure zone 28.

It is desirable that the piston assembly 32 be light in weight and the seals 32a and 32b be soft and create low friction such that the piston assembly 32 will be biased to move by less than about 0.5 psi pressure differential, preferably from about 0.3 to about 0.5 psi, between the reservoir fluid pressure zone 28 and the motor fluid pressure zone 30. The upper seals 32a are held in position by snap rings 32c and are longitudinally displaced along the axis of the housing 10 from the lower seals 32b which are held in position by snap rings 32d. When there is eccentricity between the tube 36 and the inner surface 12d, longitudinal displacement between seals 32a and 32b allows piston assembly 32 to adjust itself about the axis of a transverse plane through seals 32a and 32b and to permit those seals to remain concentric and in sealing contact with tube 36 and inner housing surface 12d, respectively. Thus in one of the embodiments of this invention, the variable capacity chamber VC is created by the above described piston assembly moving easily to and from within such variable capacity chamber VC. In the embodiment detailed in FIG. 3 and 5, the well known and widely used bladder assembly 34 is secured around shaft 14 to tube 36 which is formed of sufficient internal diameter to create annular passageway 38 to allow bidirectional flow of motor fluid to and from the motor 200 to perform several purposes, including lubrication. The bladder assembly 34 is held on the tube 36 by clip rings 34a when the internal elements of the protective device 500 are assembled. In the device described in FIGS. 3 and 5, the reservoir, or well, fluid enters through vent 26 into the well bore fluid pressure zone 28 causing the bladder assembly 34 to put pressure on the motor fluid in the motor fluid pressure zone 30 and move such fluid upwardly through passageways 34b in the bladder assembly 34. Thus, in the event that the bladder assembly 34 springs a leak and is invaded by reservoir fluid, the fluid must progress upwardly the entire distance of the variable capacity chamber VC in order to exit upwardly through conduit 34b to enter to the constant capacity chamber CC immediately above the variable capacity chamber VC. The constant capacity chamber CC is filled with motor fluid and exits the constant capacity chamber CC through port 36a in tube 36 where it enters the annular passageway 38 and is able to migrate downwardly toward the motor 200. Those skilled in the art will understand that the constant capacity chamber CC can be lengthened and the port 36a spaced at any desired distance above the bladder assembly 34 to meet specific needs. It will be further understood that whereas FIGS. 3, 5 and 6 depict a single bladder assembly 34, a plurality of such bladder assemblies can be installed axially along tube 36 and communicate with each other to increase the capacity of variable capacity chamber VC.

Tube 36, as shown in FIGS. 2 and 3, is secured at the top by bearing sleeve 20 where its reduced diameter upper portion 36b slides beneath the inside diameter 20a of the bearing sleeve 20 which remains stationary while shaft 14 rotates against bushing 40 carried by bearing sleeve 20 which is positioned by dowel 16d carried by the bearing sleeve 20 to allow passage of motor fluid from upper regions of the protective device 500 toward the constant capacity chamber CC. Thus it is noted that the motor fluid proceeds from the motor fluid pressure zone 30 inside the bladder assembly 34 upwardly through the conduit 34b into the constant capacity chamber CC before entering the annular passageway 38 for conveyance to the motor 200. Of course, it may flow in either direction through annular passageway 38 as described above. In the practice of the present invention, failure of the bladder would still require the upward migration of contaminated motor fluid before the fluid can finally enter the constant capacity chamber CC and thence port 36a for downward movement towards the motor 200 leaving ample time for gravity separation of the heavier components of the well fluids during periods of relative stability of the system.

In the embodiment of this invention shown in FIG. 2, the upward movement of the pressure sensitive partition in the form of the piston assembly 32 about the tube 36 is restricted by the presence of snap rings 36c where the channel for communication between the variable capacity chambers VC and the constant capacity chambers CC is a downwardly facing stand pipe 42 creating an area in the variable capacity chamber VC where the motor fluid would be trapped. Note in FIG. 4 the stand pipe 42 is facing upwardly in the constant capacity chamber CC and that no such restriction or upward movement is necessary. Either is acceptable in the practice of this invention. It should be understood that the position, length and direction of the stand pipe 42 may be established by one skilled in the art of designing such equipment and considering particular well applications including the bottom hole conditions and the make-up of the well fluid that may potentially transgress seals to ultimately gain entrance to the constant capacity chamber CC. In the embodiment utilizing a bladder shown in FIG. 5, the stand pipe 42 has a one-way check valve 42a selected to open at about 3 to about 5 psi pressure and permit excess motor fluid to be exhausted from chamber 52 into pressure zone 28, but the valve 42a also prohibits upward flow through stand pipe 42 from pressure zone 28. Motor fluid normally exits constant capacity chamber CC through port 36a into annular passage 38 for communication with the motor 200. Near the upper end of shaft 14 is located at least one, and preferably three, rotating seals 44, 46 and 48 that cooperate with the shaft 14 and head 10a, ring 46b and bearing sleeve 48b to prohibit downward migration of well fluid along shaft 14 and into inner chamber 52. Retainer rings 44a, 46a and 48a, mounted to shaft 14, restrain the dynamic portion of seals 44, 46 and 48 to their respective positions along shaft 14. Seal 44 provides the upper closure of the interior of the housing 10. It will be understood that seals 44, 46 and 48 are unidirectional with positive opposition to pressure from above but will bypass motor fluid from below when the pressure of the motor fluid below a rotating seal exceeds the pressure above the seal by a selected value of from about 10 to about 15 psi. The passageway 10e fitted with a fill plug 10d in the head 10a opens into a small, constant capacity, upper expansion chamber 46e housing rotating seal 46. Chamber 46e is reduced in volume by a doughnut-shaped ring 50 bearing upon a plurality of circular wave springs 24. Ring 46b carries with it a check valve 46d which allows upward flow into upper expansion chamber 46e created by rotating seal 46 and restricts any downward flow.

Shown in the drawings of this application is an optional, though preferred, third rotating seal 48, similarly carried by a ring 48b sealed against the inner surface 12d of the body 12 with an O-ring 48c and carrying a one-way check valve 48d to allow upward flow of motor fluid through the small, constant capacity, lower expansion chamber 48g thus created by check valve 48d restricting any downward flow. A donut-shaped ring 48h spaces ring 46b and ring 48b and also reduces the volume of the lower expansion chamber 48g. It is preferable to minimize the size of chambers 46e and 48g to minimize expansion, and thus, loss of motor fluid through the seals. FIGS. 4 and 5 show a retainer ring 48k expanded into groove 12d in the inner surface 12a of body 12 and supporting ring 48b. Check valves 46d and 48d are selected to open at about 3 to 5 psi differential pressure from below and permit upward flow of motor fluid from inner chamber 52. The very small excess volume of motor fluid expanded in chambers 46e and 48g, in response to increased temperature, will bypass the uppermost rotating seal 44 and be expelled into the well bore. Subsequently, when the motor fluid contracts in expansion chambers 46e and 48g due to decreased temperature, motor fluid will flow upwardly through check valves 46d and 48d from inner chamber 52 and replenish the small excess volume of motor fluid lost to the well bore. It is readily recognized that the plurality of rotating seals 44, 46 and 48 placed near the top of shaft 14 in housing 10, and expansion chambers 46e and 48g will provide superior protection for the motor 200 from the invasion of well fluid from the upper end of the protection device 500. This is particularly important as most fluids produced from oil bearing formations include brine which is an excellent electrolyte and has a higher specific gravity than the motor fluid in protection device 500. Therefore, intrusive brine, being very detrimental to the electrical integrity of the motor 200, would quickly gravitate downwardly toward the motor. It is noted that the support ring 48b for rotating seal 48 is shown as an upper bearing sleeve carrying bushing 48f and having a port 48e communicating with the shaft 14 in chamber 52, created by spacer sleeve 54 in the body 12, filled with motor fluid. Various details are shown for positioning and holding the rotating seals which are well known to those skilled in the art and many variations could be adopted by same to achieve such a purpose. Shown are seals securing a restrainer plate against ring 46b and sleeve 48b. Other modes are known and acceptable.

To allow filling the device 500 with motor fluid, the head 10a is threaded for a fill plug 10d which is removed to provide external communication with passage 10e. The base 10b has a threaded fill plug 10f which is removed to provide external communication with passage 10g. After the device 500 and motor 200 are assembled, the fill plug 10d would be removed to vent air from the housing 10 as motor fluid is forced upwardly through passage 10g from a fluid pump means connected to the threaded portion vacated by plug 10f. After housing 10 is filled with motor fluid, the plugs 10d and 10f are screwed into their original locations to seal the openings. A vacuum system of filling such a device is old in the art and may also be employed by connecting a vacuum line to the head 10a in lieu of plug 10d and a motor fluid source to the thread vacated by plug 10f. Subsequently, a vacuum is created in housing 10 and motor fluid would be timely introduced to effectively fill the device 500. Plugs 10d and 10f would then be reinstalled.

Directing attention to the bottom of shaft 14, it is journaled into position through a bushing 56 held against the shaft 14 (head 10a is similarly journaled about the shaft 14) by the base 10b which includes a passage 10g for communicating with the interior of the motor 200 from the annular passageway 38 or 62. It will be recognized that motor fluid can also communicate between the motor 200 and the annular passage 38 or 62, through the annular space between the shaft 14 and the bushing 56. Passage 10g also serves as the filling passage when plug 10f is removed.

The embodiments shown in FIGS. 2 and 3 show the thrust bearing assembly 22 being carried above the variable capacity chamber VC and the constant capacity chamber CC, whereas the embodiments of FIGS. 4, 5 and 6 depict bearing 22 being carried below the variable capacity chamber VC and constant capacity chamber CC. The thrust bearing 22 is a standardly available commodity well known to those skilled in the art. The dynamic component of the thrust bearing 22, rotor 22e, is held in place about shaft 14 by split ring 22a and snap ring 22c and keyed to shaft 14 by key 22b. It is seen that the stator 22d of the thrust bearing assembly 22 is held in its position by dowel 16d carried by the bearing sleeve 20. The details in FIGS. 4 and 5 show a lower chamber 58 formed by an additional tube 60 oriented about the shaft 14 to create an auxiliary annular passageway 62 being formed between the internal surface 60a of tube 60 and the shaft 14 to convey fluid from chamber 58 to the motor 200 thus providing an additional cavity within which to capture contaminated fluid, therefore, prolonging the motor cycle time in the well. The motor fluid carried by annular passageway 38, as seen in FIGS. 4 and 5, traverses through passageway 64, past circular wave springs 24 through thrust bearing assembly 22, passageway 20b and into chamber 58. It then enters the lower annular passageway 62 through port 66 and exits through passageway 10g and thus to the motor 200 being protected.

Having described the foregoing embodiments of this invention, it is well to note that by virtue of the passageway orientation, when urged by pressure from the pressure sensitive partition, whether upon the piston assembly 32 or the bladder assembly 34, the motor fluid traverses upwardly through a barrier formed by upper ring 34d sealed tight by O-ring 34e before entering a position whereby it may traverse downwardly toward the motor to be protected. This avoids any premature contact between motor fluid being destined to be received by the motor and well fluid which would contaminate such motor fluid. In many prior art devices, the motor fluid is subject to contact with such reservoir fluids prior to arriving at the motor.

In the foregoing description and drawings many commonly known elements are mentioned for which other conventional and known elements and combinations well known to those skilled in the art may be substituted. Additional variations and arrangements of the elements of the protective device of this invention may be used to arrive at the above described advantages and objectives without departing from the scope and content of the this invention.

I claim:

1. In an improved submersible pump assembly having a submersible electric motor powering a downhole pump with a protective device oriented above, and in fluid communication with the interior of the motor, a shaft operably connected between the motor and the pump extending axially through the protective device with a thrust bearing to orient the shaft and absorb axial forces from the pump, an improved means in the protective device for avoiding well fluid invasion of the motor from a bore, comprising in combination:

a housing including a tubular body with said axially aligned shaft extending throughout, a closed head, a bottom, a base disposed at said bottom, and said housing being configured to connect to the pump and the motor to operably engage the shaft;

at least one variable capacity chamber within the housing for containing the motor fluid having a motor fluid pressure zone and a well fluid pressure zone in fluid communication with the well bore and separated from the motor fluid pressure zone by a pressure sensitive partition whereby exertion of an increase of external force on the motor fluid urges the fluid upward in said protective device;

at least one constant capacity chamber for receiving the motor fluid in fluid communication with the motor fluid pressure zone of the variable capacity chamber and directing the motor fluid into an annular passage, described by a tube oriented about the shaft, communicating with the interior of the motor; and a vent proximate the bottom of the housing and extending through the housing and communicating with the well bore and the well fluid pressure zone wherein heavier components of the well fluid can separate and exit the housing through the vent while being displaced by well fluid having a lower specific gravity.

2. The improved protection device of claim 1 wherein the well fluid pressure zone of the variable capacity chamber has a top and a bottom and the vent is proximate the bottom of the well fluid pressure zone of the variable capacity chamber.

3. The protective device of claim 1 which includes at least one constant capacity chamber and rotatable seal as part of the head of the housing of the chamber in fluid communication with the variable capacity chamber to receive lubrication fluid for the rotatable seal.

4. The protective device of claim 1 which includes:

a first rotatable seal in cooperation with the shaft as part of the closed head of the housing;

a second rotatable seal axially spaced below said first rotatable seal and cooperating with the shaft and housing to form a sealed, constant-capacity, chamber therebetween and in fluid communication with the motor fluid pressure zone of the variable-capacity chamber; and one-way check valves means allowing motor fluid to flow upwardly into the sealed chamber.

5. The protective device of claim 4 which includes a plurality of sealed, constant-capacity, chambers axially spaced one below the other and described having a rotatable seal at the top and bottom of each select chamber which is in fluid communication with the motor fluid pressure zone of the variable capacity chamber and having a one-way check valve means allowing motor fluid to flow upwardly from one sealed chamber to another.

6. The improved protector of claim 1 wherein the pressure sensitive partition in the variable capacity chamber is formed by a flexible, tubular bladder means coaxially disposed in said housing separating the motor fluid pressure zone and the well fluid pressure zone.

7. The improved protector of claim 6 wherein the bladder means is carried by the tube acting in cooperation with the shaft to form the annular passage for conveying motor fluid from the constant capacity chamber to the motor.

8. An improved protector which comprises:
a housing including a tubular body with an axially aligned shaft extending throughout, a closed head, a bottom, a base disposed at said bottom, and said housing being configured to connect to a pump and a motor to operably engage the shaft;
at least one variable capacity chamber within the housing for containing the motor fluid and having a motor fluid pressure zone and a well fluid pressure zone, said well fluid pressure zone having a top and a bottom and in fluid communication with the well bore and separated from the motor fluid pressure zone by a free sliding piston means coaxially disposed in said chamber whereby exertion of an increase of external force on the motor fluid urges the fluid upward in said protective device;
at least one constant capacity chamber for receiving the motor fluid in fluid communication with the motor fluid pressure zone of the variable capacity chamber and directing the motor fluid into an annular passage, described by a tube oriented about the shaft, communicating with the interior of the motor;
a vent proximate the bottom of the well fluid pressure zone and extending through the housing and communicating with the well bore and the well fluid pressure zone wherein heavier components of the well fluid can separate and exit the housing through the vent while being displaced by well fluid having a lower specific gravity;
a piston assembly in the variable capacity chamber;
a tube axially aligned about the shaft of the device forming the annular passage in cooperation with the shaft;
an inwardly-directed sealing means carried by the piston assembly in slidable, sealable contact with the tube; and
an outwardly-facing sealing means carried by the piston assembly in slidable, sealable contact with the interior surface of the tubular body, whereby the piston means moves in response to differential pressure between the well fluid pressure zone and the motor fluid pressure zone.

9. The improved protective device of claim 8 wherein at least one seal means carried by the piston assembly is unidirectional and will bypass motor fluid from the motor fluid pressure zone into the well fluid pressure zone when higher pressure in the motor fluid pressure zone exceeds the pressure in the well fluid pressure zone by a selected pressure.

10. The improved protective device of claim 9 wherein the selected pressure at which motor fluid will pass the sealing means and enter the well fluid pressure zone is from about 6 psi to about 8 psi.

11. The improved protective device of claim 8 wherein the inwardly-directed sealing means on the piston assembly is axially spaced from outwardly-facing sealing means.

12. In an improved submersible pump assembly having a downhole pump powered by a fluid-filled submersible electric motor with a fluid-filled protective device for the motor oriented therebetween and in fluid communication with the interior of the motor mounted below, an improved means in the protective device for avoiding well fluid invasion of the motor, comprising in combination:
a housing including a tubular body with a head, a bottom, and a base disposed at said bottom, and configured to connect to the pump and motor;
a shaft carried by, and extending axially through, the housing and operably connected between the pump and motor and carrying a dynamic component of a thrust bearing operably engaging companion static components carried by the housing to orient the shaft and absorb axial forces from the pump;
a rotating seal between the shaft and an upper portion of the housing creating the upper closure for the interior of the housing;
a tube axially aligned about the shaft forming an annular passage with the shaft and adapted to receive motor fluid from a chamber and communicating with the interior of the motor;
a variable capacity chamber within the housing comprising;
a flexible, tubular bladder means radially disposed about and attached to the tube providing a pressure sensitive partition between the motor fluid in the housing from well fluid in the housing, thereby creating a variably capacity chamber having a motor fluid pressure zone and a well fluid pressure zone having a top and a bottom and responsive to move when biased by differential pressure therebetween, whereby exertion of an increase of external force from the well fluid on the bladder means urges motor fluid upward in the chamber before being directed downward toward the motor through the annular passage;
a vent proximate the bottom of the well fluid pressure zone and extending through the housing and communicating with the well bore and the well fluid pressure zone wherein heavier components of the well fluid can separate and exit the housing through the vent while being displaced by well fluid having a lower specific gravity;
at least one constant capacity chamber for receiving motor fluid in fluid communication with the motor fluid pressure zone and the interior of the motor; and
means to exhaust excess motor fluid from the protective device to relieve internal pressure.

13. In an improved submersible pump assembly having a downhole pump powered by a fluid-filled submersible electric motor with a fluid-filled protective device for the motor oriented therebetween and in fluid communication with the interior of the motor mounted below, an improved means in the protective device for avoiding well fluid invasion of the motor, comprising in combination:
a housing including a tubular body with a head and base configured to connect to the pump and motor;
a shaft carried by, and extending axially through, the housing and operably connected between the pump and motor and carrying a dynamic component of a thrust bearing operably engaging companion static components carried by the housing to orient the shaft and absorb axial forces from the pump;

a rotating seal between the shaft and an upper portion of the housing creating the upper closure for the interior of the housing;

a tube axially aligned about the shaft forming an annular passage with the shaft and adapted to receive motor fluid from a chamber and communicating with the interior of the motor;

a reciprocable, free-sliding piston means coaxially disposed about the tube and comprising a piston assembly carrying an inwardly-directed seal means in slidable, sealable contact with the tube and an outwardly-facing seal means in slidable, sealable contact with the interior surface of the housing and thereby providing a pressure sensitive partition between a motor fluid pressure zone and a well fluid pressure zone whereby the piston assembly moves in response to differential pressure between such pressure zones such that an increase of well fluid force on the piston urges the motor fluid upward in the chamber before being directed downward toward the motor;

a vent through the housing communicating the well bore and well fluid pressure zone wherein the heavier components of the well fluid can separate and exit the housing through the vent while being displaced by well fluid having a lower specific gravity;

at least one constant capacity chamber for receiving motor fluid in fluid communication with the motor fluid pressure zone and the motor; and means to exhaust excess motor fluid from the protective device to relieve internal motor fluid pressure.

14. In an improved submersible pump assembly for use in a well bore containing well fluid, said pump assembly having a submersible electric motor for powering a downhole pump with a protective device oriented above, and in fluid communication with the interior of the motor, a shaft operably connected between the motor and pump extending axially through the protective device with a thrust bearing having a stator and a rotor to orient the shaft and absorb axial forces from the pump, the improvement which comprises:

a housing including a one piece tubular body, circumferentially perforated at a predetermined distance from each end, with a head, a bottom, and a base disposed at said bottom, and configured to connect to the pump and motor and operably engage the shaft;

a support ring having an open central passageway positioned in the housing transverse the longitudinal axis of the housing at the circumferential perforations and welded to the tube through the perforations to form a surface against which parts of the protection device may be positioned;

means carried by the ring for securing the stator of the thrust bearing from rotation; and a vent proximate the bottom of the housing communicating with the well bore wherein heavier components of well fluid can separate and exit the housing through the vent while being displaced by well fluid having a lower specific gravity.

15. The assembly of claim 14 which includes a vent through the base communicating the interior of the housing with the well bore,

* * * * *

UNITED STATES PATENT AND TRADEMARK OFFICE
CERTIFICATE OF CORRECTION

PATENT NO. : 5,367,214
DATED : November 22, 1994
INVENTOR(S) : Turner, Jr.

It is certified that error appears in the above-identified patent and that said Letters Patent is hereby corrected as shown below:

In column 12, line 60 delete "select" and insert therefor -- sealed --.

In column 14, line 24 delete ";" and insert therefor -- : --.

In column 14, line 29 delete "variably" and insert therefor -- variable --.

In column 16, line 32 delete "," and insert therefor -- . --.

Signed and Sealed this

Twenty-second Day of August, 1995

Attest:

BRUCE LEHMAN

Attesting Officer  Commissioner of Patents and Trademarks